(12) United States Patent
Alberts

(10) Patent No.: US 7,334,778 B2
(45) Date of Patent: Feb. 26, 2008

(54) MODULAR STACKABLE FENCE APPARATUS

(75) Inventor: Michael J. Alberts, Hanna (CA)

(73) Assignee: 747379 Alberta Ltd., Hanna, Alberta (CA)

( * ) Notice: Subject to any disclaimer, the term of this patent is extended or adjusted under 35 U.S.C. 154(b) by 0 days.

(21) Appl. No.: 10/773,250

(22) Filed: Feb. 9, 2004

(65) Prior Publication Data

US 2004/0262590 A1    Dec. 30, 2004

(30) Foreign Application Priority Data

Jun. 27, 2003    (CA) .................................... 2433743

(51) Int. Cl.
*E04H 17/00*    (2006.01)
*A01K 3/00*    (2006.01)

(52) U.S. Cl. ............................. 256/24; 256/31; 256/73; 119/512; 119/513

(58) Field of Classification Search ................. 256/30, 256/31, 73, 24; 119/513, 512
See application file for complete search history.

(56) References Cited

U.S. PATENT DOCUMENTS

| | | | |
|---|---|---|---|
| 42,166 A | | 4/1864 | Clapp et al. |
| 113,753 A | * | 4/1871 | Drummond .................. 119/513 |
| 197,806 A | | 12/1877 | Walter |
| 257,168 A | * | 5/1882 | Lape ............................. 256/64 |
| 275,884 A | * | 4/1883 | Cease ........................... 256/31 |
| 300,455 A | * | 6/1884 | Faught .......................... 256/31 |
| 399,648 A | * | 3/1889 | Barber .......................... 256/31 |
| 456,064 A | * | 7/1891 | Ruhle ........................... 256/31 |
| 564,857 A | * | 7/1896 | Whisler ......................... 256/31 |
| 659,117 A | * | 10/1900 | White et al. ................ 119/513 |
| 741,650 A | | 10/1903 | Frey |
| 1,214,705 A | * | 2/1917 | Neely .......................... 256/31 |
| 1,545,909 A | | 7/1925 | McKinnon |
| 1,906,442 A | * | 5/1933 | Barrus .......................... 256/31 |
| 2,581,318 A | | 1/1952 | Bartlett |
| 2,855,183 A | | 10/1958 | Moore |
| 3,966,172 A | * | 6/1976 | Garrett ...................... 256/12.5 |

(Continued)

FOREIGN PATENT DOCUMENTS

CA    1091968    12/1980

(Continued)

OTHER PUBLICATIONS www.avarte.fi; design Yrjo Kukkapuro 1997; models 551,552,554,542 and 544.

(Continued)

*Primary Examiner*—Daniel P. Stodola
*Assistant Examiner*—Ernesto Garcia
(74) *Attorney, Agent, or Firm*—Sean W. Goodwin; Linda M. Thompson

(57)    ABSTRACT

A unitary stackable fence module having end assemblies and span members is provided for forming a perimeter fence having an inwardly inclined profile. A right angle end support has vertical and horizontal members and an angle arm, spaced from and attached to a side edge of the vertical and horizontal members adjacent the span members. The unique arrangement permits a plurality of fence modules to be stacked for transport or storage. Loops formed on the vertical members permit pivotal pinning of fence modules together to form perimeter fences of any polygonal shape.

9 Claims, 6 Drawing Sheets

U.S. PATENT DOCUMENTS

| | | | |
|---|---|---|---|
| 4,844,424 A | | 7/1989 | Knudslien |
| 5,184,800 A | | 2/1993 | Tabler |
| 5,213,312 A | | 5/1993 | MacDonald |
| 5,533,714 A | | 7/1996 | St. John |
| 6,086,013 A | * | 7/2000 | Looney et al. ............ 242/594.4 |
| 2004/0217341 A1 | * | 11/2004 | Gumb .......................... 256/64 |

FOREIGN PATENT DOCUMENTS

| | | | |
|---|---|---|---|
| CA | 1168491 | | 6/1984 |
| DE | 2031200 A | * | 1/1971 |
| FR | 2570422 A1 | * | 3/1986 |
| FR | 2741092 A1 | * | 5/1997 |

OTHER PUBLICATIONS www.oodlesofpartsplus.com/stacking_chairs.htm; pp. 1-9; date Sep. 26, 2005.
www.oodlesofpartsplus.com/fortyfour_stacking_chairs.htm; pp. 1-6, Sep. 26, 2005.
www.mossonline.com/product-exec/product_id/29246; Sep. 26, 2005.
www.swedish-design.com/all/BMI406/; Sep. 26, 2005.
www.dpscs.state.md.us; Sep. 28, 2005.
www.slverstateindustries.com; Sep. 28, 2005.

* cited by examiner

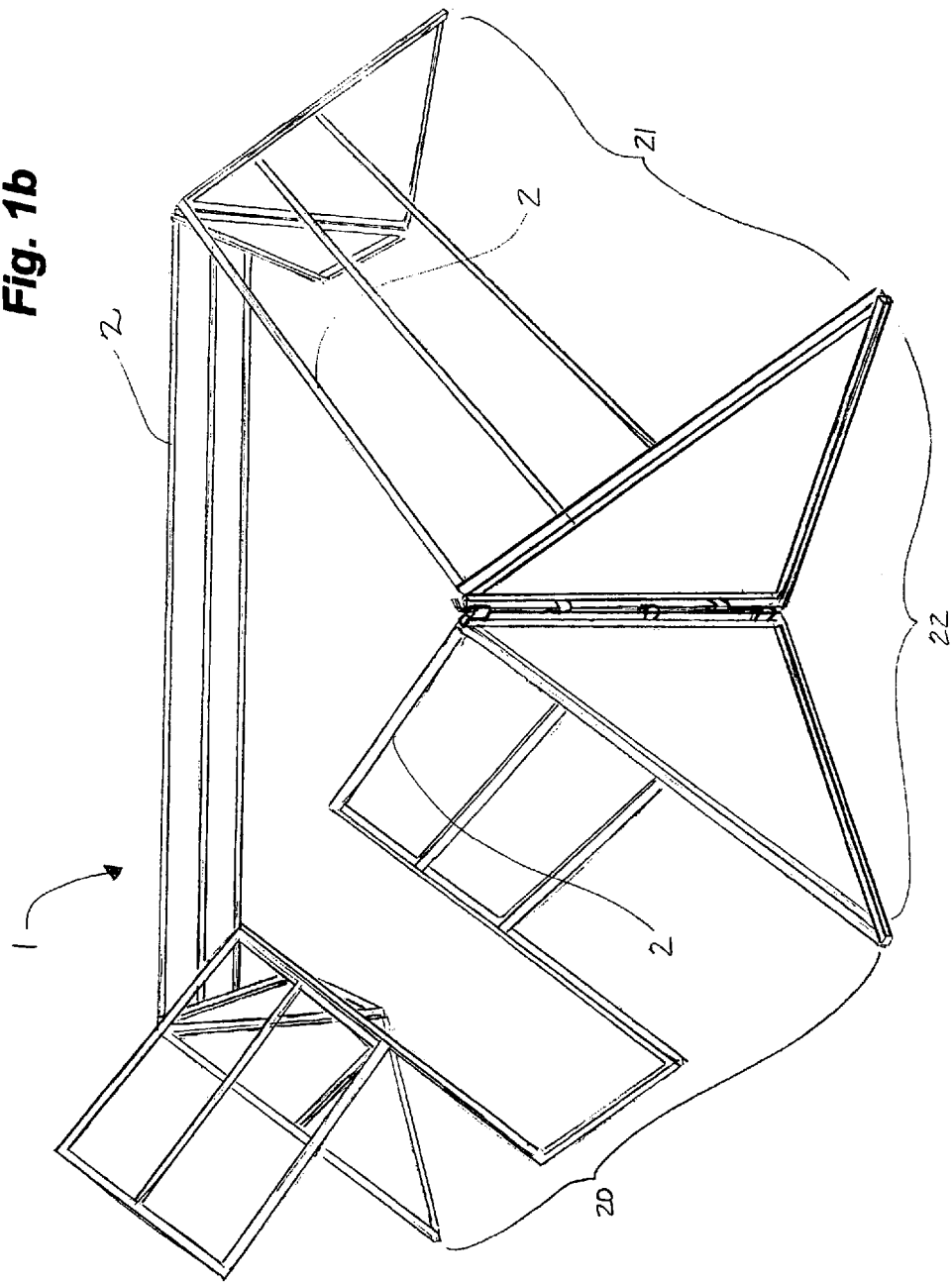

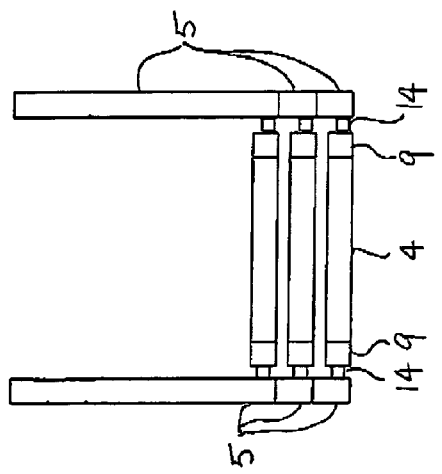
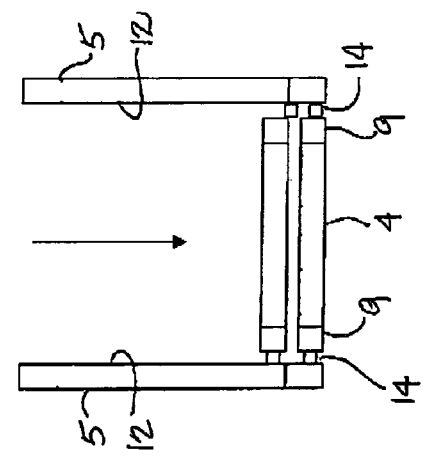
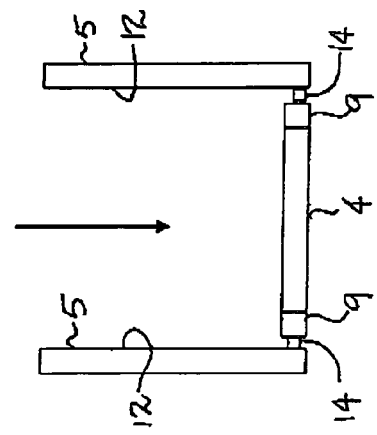
Fig. 4a
Fig. 4b
Fig. 4c

MODULAR STACKABLE FENCE APPARATUS

FIELD OF THE INVENTION

The invention relates to fence structures formed from modular assemblies and more particularly to modular fence assemblies that can be stacked for transport.

BACKGROUND OF THE INVENTION

It is known to provide perimeter fence structures around installations such as an oilfield drilling site or wellhead. The perimeter fence must effectively prevent animal encroachment, particularly by cattle, as many of these installations are found on agricultural range land.

Cattle are known to rub against conventional fencing, such as wire or wire mesh panels having vertical posts. Over time, the constant rubbing results in damage and disruption of the integrity of the fence.

Further, modular fence structures are typically moved from site to site such as when drilling ends or wells no longer produce. Thus, it is of some considerable importance that the perimeter fence structures are modular and are easily transported in conventional pickup trucks or on towed trailers. Onsite, access to the enclosed installation may be required by large equipment such as service rigs. It is advantageous if the fence assemblies are readily connected and disconnected from each other to provide access when required.

As many drilling sites are located in areas which are subject to below-freezing ambient temperatures, it is also important that the modular assemblies used to create the perimeter fence are not secured to the ground in such a fashion that the fastenings become frozen into the ground. Removal of frozen fastenings often results in damage to both the fastenings and to the fence assemblies.

U.S. Pat. No. 5,533,714 to St. John teaches a modular fence apparatus for use in constructing a perimeter fence to prevent entry of animals and cattle into the fenced area. The fence apparatus comprises flat panels with span members. The flat panels are connected to discrete corner assemblies that are angled so as to set each panel at an angle. The panels are angled inward along a top edge. Further, the corner assemblies have span members connected between frame members to form triangular angled corner panels. While the flat panels are easily stacked for transport, the corner assemblies, which comprise three upright posts, 2 angled top members and the span members, are awkward and not readily stacked. Each flat panel must be connected at each end to a corner assembly using fasteners when the perimeter is assembled and similarly, fasteners must be removed to gain access for large equipment or for disassembly. If the perimeter fence is required to be other than rectangular, separate corner assemblies would be required having various preset angles.

Canadian patent 1,091,968 to Hillman teaches a perimeter fence having generally vertically disposed rigid post members which have a lower portion that engages the ground and an upper, inwardly inclined portion to which the rails are attached. At least one of the rails is disposed at the height of the average bovine knee to prevent leaning or rubbing. Rails, extending at right angles to the corner posts, are welded or otherwise fastened to the corner posts. The rails are split mid-span and connected by welding, by removable fasteners or the like. Clearly, assembly on site requires significant time and effort. If formed as modules having the rails pre-welded to the corner posts, each module is relatively large and cumbersome. Transport of the modules would be awkward and the number of modules that could be transported at any one time may be limited. As with the perimeter fence of St. John, changes in the shape of the fence would require welding the rails to the corner posts at a variety of angles, necessitating on-site assembly or stocking of a number of different modules.

Clearly, what is required is a modular fence assembly that can be readily stacked for transport in a truck bed. Further, the modules should require a minimum of assembly on site and allow for forming a perimeter fence of whatever shape is required for each unique location. Preferably, the fence should be easily opened for access to large equipment such as a service rig.

SUMMARY OF THE INVENTION

A fence module for forming a perimeter fence is provided. The fence module has two end assemblies connected by span members. The end assemblies comprise a vertical member connected at a lower end to a first end of a horizontal member, the vertical and horizontal members being in the same plane, and an angle arm connected between an upper end of the vertical member and a second end of the horizontal member. The angle arm is connected to an inside edge of the vertical and horizontal members to permit sufficient space on an inside of the fence module between the end supports to allow successive fence modules to be oriented onto the span members and stacked in a nested arrangement for transport and storage, the angle arm and attached span members of each successive like fence module fitting between the vertical and horizontal members of the previous fence module.

In a preferred embodiment of the invention, a spacer means is positioned between the angle arm and the vertical and horizontal members to provide additional tolerance resulting in the ability to stack large numbers of fence modules without restriction.

Successive fence modules are readily fastened to each other for forming a perimeter fence, without the need for additional structural elements. Attachments means, preferably loops, are spaced along the vertical members of the end assemblies. Preferably the loops on a second end support of a first fence module are spaced to co-operate with the loops on a first end support of a subsequent fence module to permit vertical alignment of the loops to allow passage of a pin therethrough. Thus, the fence modules are pivotally attached to one another and rotation about the pin allows the fence modules to be arranged at infinite angles permitting forming perimeter fences having a number of polygonal shapes.

BRIEF DESCRIPTION OF THE DRAWINGS

FIG. 1b is a perspective view of one embodiment of a fence module of the present invention assembled into a triangular perimeter fence;

FIG. 2a is a partial side view of a fence module according to FIG. 1a,

FIG. 2b is a close up view of the detail of the connection between a right angle corner brace and an angle arm according to FIG. 2a;

FIGS. 4a-c are front schematic views of a plurality of fence modules according to FIG. 1a and from a typical viewpoint IV-IV of FIG. 5a, illustrating the stackability of the modules oriented to be supported on the span members, more particularly, FIG. 4a is a plurality of modules prior to stacking, FIG. 4b and FIG. 4c illustrate the relationship between modules as the modules are stacked; FIG. 5a is a plurality of modules prior to stacking and FIG. 5b illustrates the relationship between successive right angle corner braces and angle arms as the modules are stacked.

DETAILED DESCRIPTION OF THE PREFERRED EMBODIMENT

Figure 1A:
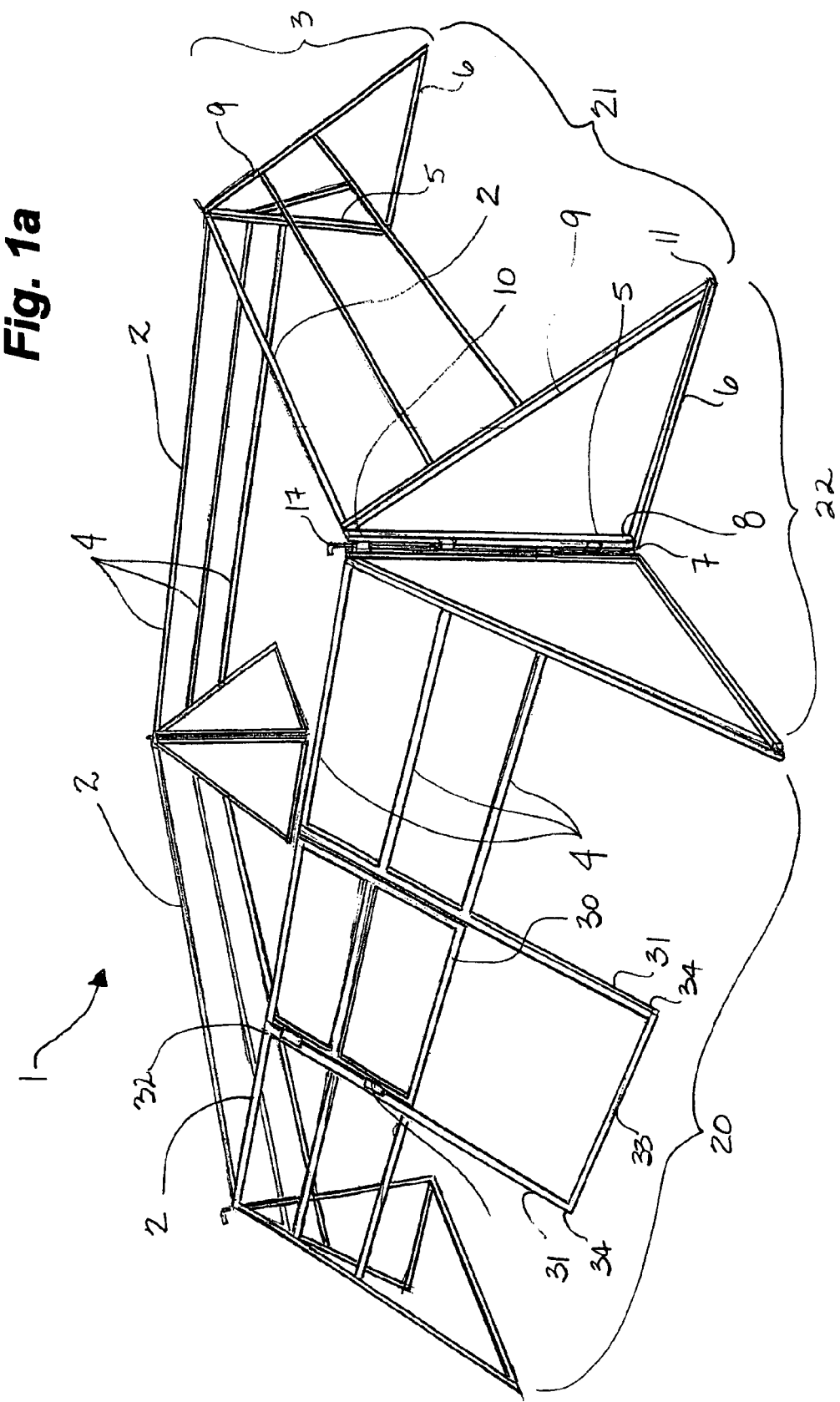
FIG. 1a is a perspective view of one embodiment of a fence module of the present invention assembled into a rectangular perimeter fence.
Figures 2A, 2B:
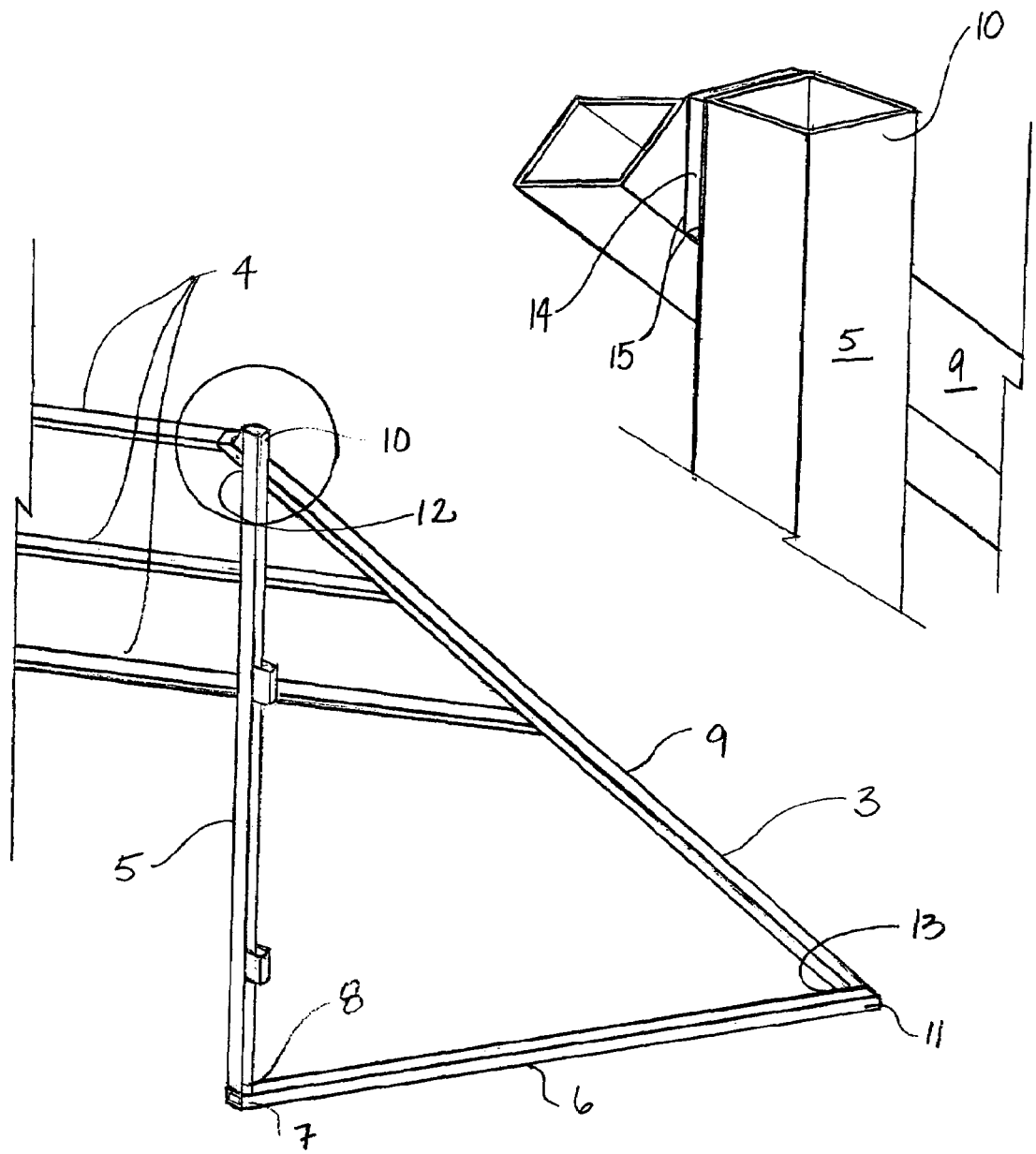

Having reference to FIG. 1a, a perimeter fence 1, formed using unitary stackable fence modules 2 of one embodiment of the present invention, is shown.

As shown in FIGS. 1a-3, each fence module 2 comprises two delimiting end supports 3 spaced apart and forming an inside therebetween by a plurality of span members 4 attached therebetween. Each end support 3 has a substantially vertical member 5, a horizontal member 6 connected at a first end 7 to a lower end 8 of the substantially vertical member 5 and an angle arm 9 connected between an upper end 10 of the substantially vertical member 5 and a second end 11 of the horizontal member 6. The vertical and horizontal members 5,6 are in the same plane, as seen in FIG. 2a and FIG. 5a. The end supports 3 act as braces to support the span members 4. The span members 4 are connected at each end to the angle arms 9 creating an upwardly and inwardly inclined fence module 2, suitable for preventing intrusion and damage by animals and livestock. The span members 4 are spaced so as to have at least one span member 4 positioned at about the height of the average bovine knee and at least one span member positioned at about the height of the chest. In this way, livestock are discouraged from attempting to step over the fence 1 and, because of the inward incline, are not inclined to lean or rub against the span members 4.

Figure 3:
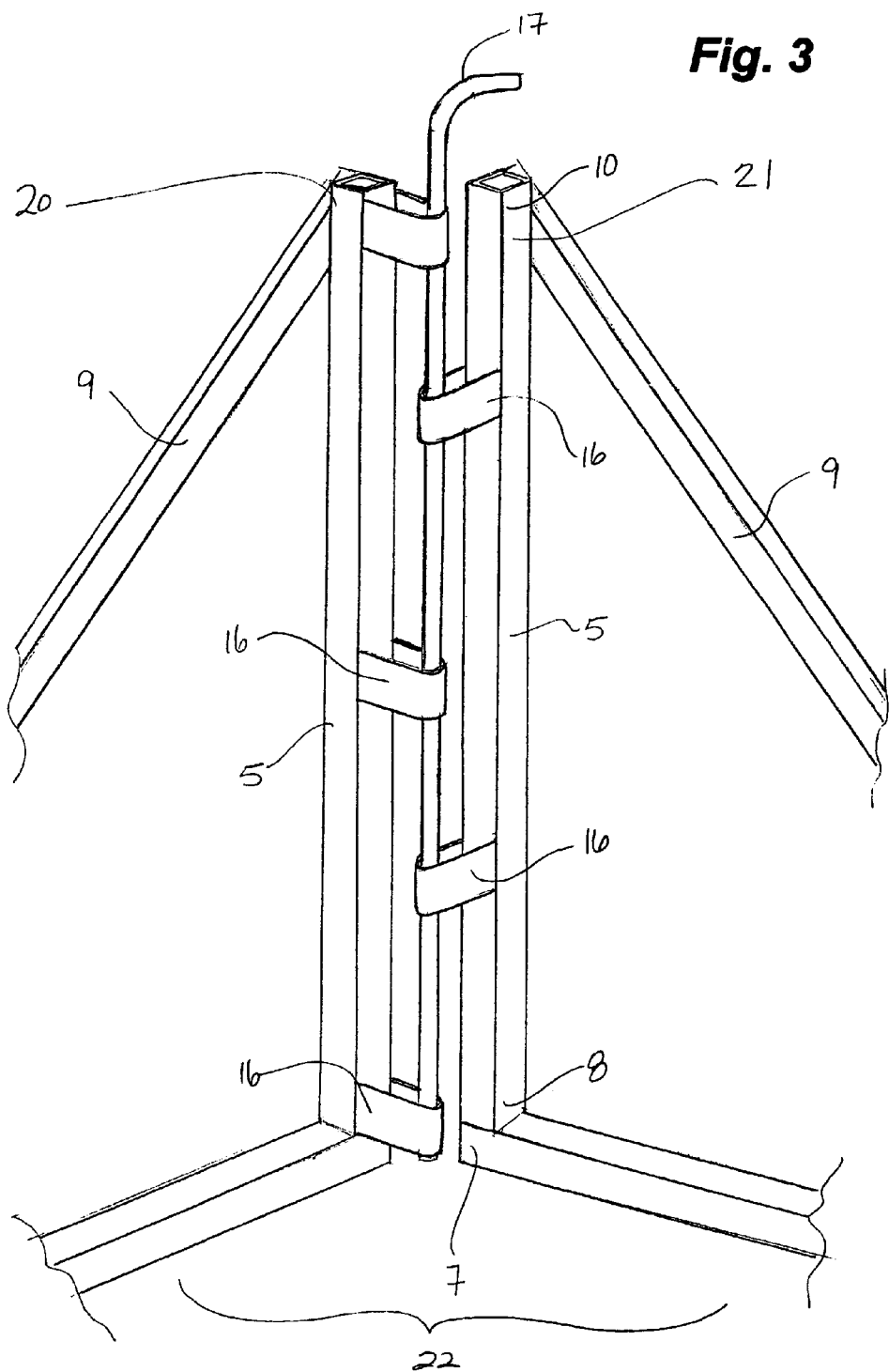
FIG. 3 is a partial perspective view of a first fence module pivotally attached to a subsequent fence module illustrating the attachment detail.

Further, best seen in FIGS. 1a-b and 3, when a first fence module 20 is attached to a subsequent fence module 21, the adjacent end supports 3 act to form a corner 22. The perimeter fence 1 is shown having a square shape (FIG. 1a), however, it will be appreciated by those skilled in the art that adjacent modules 20,21 can be pivoted at the corner 22 and the perimeter fence 1 can be formed in any number of polygonal shapes using three or more fence modules 2 (FIGS. 1a-b).

Figure 5B:
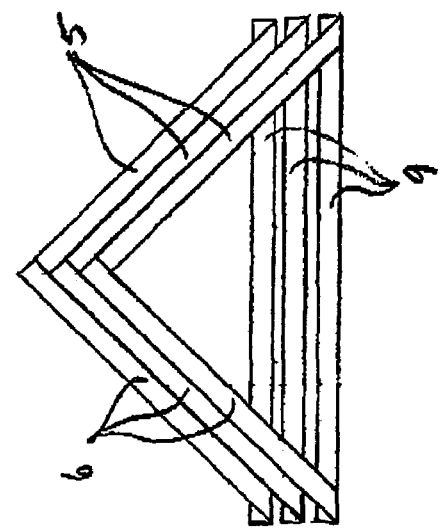
FIGS. 5a-b, are side schematic views of a plurality of fence modules according to FIG. 1a, more particularly.
Figure 5A:
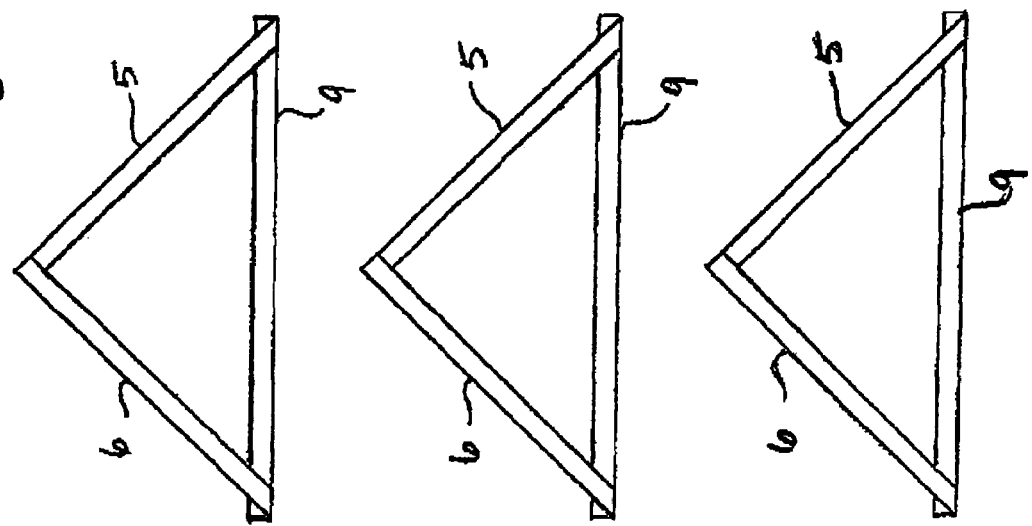

As shown in FIGS. 2a, 4a-c and 5a-5b, and in a preferred embodiment of the invention, the angle arm 9 is connected to the vertical member and to the horizontal member at inside side edges 12,13 adjacent the span members 4. This arrangement of vertical members 5, horizontal members 6 and angle arms 9 permits stacking of a plurality of like fence modules 2 in a nested arrangement (FIGS. 4b, 4c and 5b). As shown in FIG. 5b, each angle arm 9 of each successive like fence module fits inside between the vertical and horizontal members 5,6 of the previous fence module and with the vertical and horizontal members 5,6 of each successive fence module stacking above the vertical and horizontal members 5,6 of the previous fence module.

Preferably, as shown in FIGS. 2b and 4a-c, a spacer means 14 is positioned between both the substantially vertical member 5 and the horizontal member 6, and the angle arm 9 at points of connection 15 to provide additional dimensional tolerance, permitting a large number of substantially identical modules 2 to be stacked in the nested arrangement without restriction.

As shown in FIG. 3, attachment means, such as and preferably loops 16, are attached to each substantially vertical member 5 to permit pivotal attachment of the first module 20 to the subsequent module 21. The loops 16 on each of the first and subsequent module are positioned to be aligned vertically to accept a pin 17 to be passed therethrough. Thus the modules 20, 21 can be rotated about the pin 17 to form a corner 22 having an infinitely variable angle for forming different shaped perimeter fences 1.

Pins 17 used to attach subsequent modules 20,21 can be of sufficient length to permit penetration into the ground to more securely affix the perimeter fence 1 thereto. While some freezing of the pin 17 into the ground may occur with low ambient temperatures, difficult removal of the pin 17 would result in damage to the pin 17 only and not to the fence modules 2. This is a significant improvement over prior art fence modules where the leg of the module is inserted into the ground resulting in a need to repair the fence module should damage occur when removing the leg from frozen ground.

More preferably, each fence module 2 has a first end support 3,23 and a second end support 3,24. The second end support 3,24 of the first module 20 has loops 16 spaced to co-operate with loops 16 on the first end support 3,23 of the subsequent fence module 21.

In the preferred embodiment, the end supports 3,23,24 and the span members 4 are formed of tubular steel which are welded to form each fence module 2.

Additionally, as shown in FIG. 1a, at least one fence module 2 is formed having a man-door or gate 30, intermediate the span members 4, to permit access by personnel at the site. A pair of support posts 31 are positioned intermediate the span members 4 and extend from a top span member 32 to the ground and at an identical angle to that of the angle arms 9. A horizontal base member 33 extends between the support posts 31 at a lower end 34 of each of the support posts 31. The gate 30 is connected to one of the support posts 31 by two or more hinges 33.

Large equipment can readily gain access within the perimeter fence 1 by removing one of the pins 17 and pivoting one or both of the fence modules 2 to open the perimeter fence 1.

The embodiments of the invention in which an exclusive property or priviledge is claimed are defined as follows:

1. A modular fence system for forming a polygonal enclosure comprising:
    three or more stackable fence modules, each fence module comprising
        two end supports, each end support having
            a substantially vertical member connected at a lower end to a first end of a horizontal member, the vertical member and the horizontal member being in the same plane; and
            an angle arm extending between an upper end of the substantially vertical member and a second end of the horizontal member;
        a plurality of span members connected between the angle arms of the two end supports and spacing apart the two end supports in substantially parallel arrangement for forming an inside space therebetween, the angle arm of each of the end supports being connected at a side of the vertical member adjacent the inside space and at a side of the horizontal member adjacent the inside space so as to extend the inside space between the vertical member and the horizontal member of the two end supports, the inside space being open to permit the span members and angle arms of another of the three or more fence modules to fit therein for stacking of the three or more fence modules in a substantially nested arrangement; and means for pivotal attachment connected to each of the two end supports of each of the three or more fence modules and operatively connectable between adjacent fence modules of the three or more fence modules for forming the polygonal enclosure.

2. The modular fence system as described in claim 1 wherein the means for pivotal attachment on a second end support of a first fence module co-operates with the means for pivotal attachment on a first end support of a similar fence module; and the first fence module and similar fence module are rotatable about the means for pivotal attachment for forming a corner.

3. The modular fence system of claim 2 wherein the means for pivotal attachment comprises loops arranged along each vertical member of the first and second end supports, the loops of the first end support being spaced to cooperate with the loops on the second end support so as to permit vertical alignment of the loops between fence modules; and further comprising a pin for passing through the vertically aligned loops, the fence modules being pivoted about the pin.

4. The modular fence system of claim 1 wherein the pin is of sufficient length to engage a ground at the lower ends of the vertical members.

5. The modular fence system of claim 1 wherein the end supports and the span members are formed of tubular steel.

6. The modular fence system of claim 1 further comprising a man door formed intermediate the span members for permitting access.

7. A modular fence system for forming a polygonal perimeter fence comprising:

three or more stackable fence modules, each fence module comprising two end supports, each end support having a substantially vertical member connected at a lower end to a first end of a horizontal member, the vertical member and the horizontal members being in the same planes; and an angle arm extending between an upper end of the substantially vertical member and a second end of the horizontal member;

a plurality of span members connected between the angle arms of the two end supports and spacing apart the two end supports in substantially parallel arrangement for forming an inside space therebetween, the angle arm of each of the end supports being connected at a side of the vertical member and at a side of the horizontal member adjacent the inside space so as to extend the inside space between the vertical member and the horizontal member of the two end supports, the inside space being open to permit the span members and angle arms of another of the three or more fence modules to fit therein for stacking of the three or more fence modules in a substantially nested arrangement; and a pivotal attachment, connected to each of the two end supports of each of the three or more fence modules, for pivotally connecting each of the three or more fence modules to an adjacent fence module for forming the perimeter fence, the pivotal attachment further comprising a pin and loops arranged along each vertical member so as to permit vertical alignment of the loops between a second end of a first fence module and a first end of a subsequent fence module to permit passage of the pin therethrough, the pin being of sufficient length to engage a ground at the lower ends of the attached vertical members.

8. The modular fence system of claim 7 wherein at least one of the fence modules further comprises a man door formed intermediate the span members for permitting access.

9. The modular fence system of claim 7 wherein the end supports and the span members are formed of tubular steel.

* * * * *